United States Patent [19]
Wickholm et al.

[11] Patent Number: 4,824,228
[45] Date of Patent: Apr. 25, 1989

[54] STEREOMICROSCOPIC INSPECTION SYSTEM WITH LOW EYESTRAIN FEATURES

[75] Inventors: David R. Wickholm; Donald J. Strittmatter, both of Tucson, Ariz.

[73] Assignee: Hughes Aircraft Company, Los Angeles, Calif.

[21] Appl. No.: 935,866

[22] Filed: Nov. 28, 1986

[51] Int. Cl.4 ............... G02B 21/22; G02B 27/22
[52] U.S. Cl. .................................. 350/516; 350/130; 350/515
[58] Field of Search ............... 350/515, 514, 513, 512, 350/516, 517, 518, 519, 410, 130, 131, 132, 133, 137, 138, 535, 566, 571

[56] References Cited

U.S. PATENT DOCUMENTS

| | | | |
|---|---|---|---|
| 946,339 | 1/1910 | Crocker et al. | 350/133 |
| 2,574,522 | 11/1951 | Bennett | 350/535 |
| 3,143,032 | 8/1964 | Cednäs | 350/132 |
| 3,502,390 | 3/1970 | Gilmore | 350/133 |
| 4,046,463 | 9/1977 | La Rusa et al. | 351/212 |
| 4,059,336 | 11/1977 | Hopkins | 350/515 |
| 4,134,637 | 1/1979 | Leisegang | 350/514 |
| 4,571,038 | 2/1986 | Jako | 350/515 |

FOREIGN PATENT DOCUMENTS 3530928  3/1986  Fed. Rep. of Germany ...... 350/515

Primary Examiner—John K. Corbin
Assistant Examiner—Ronald M. Kachmarik
Attorney, Agent, or Firm—R. A. Hays; M. W. Sales; A. W. Karambelas

[57] ABSTRACT

A stereomicroscopic inspection system having low eyestrain features is disclosed. The system (10) includes an objective lens assembly (12) for forming an image of a viewed object (22). A prism mechanism (14) is positioned adjacent to the objective lens assembly (12) for orienting the image along a heads-up axis. A telephoto objective assembly (16) is positioned adjacent to the prism mechanism (16) for focusing the image transmitted through the prism mechanism (14). A reticle (18) is positioned adjacent to the telephoto objective assembly, and the image is focused (16) onto the reticle (18). An assembly (20) is positioned adjacent to the reticle (18) for enabling heads-up viewing of the object by the viewer, (22) said system projecting a virtual image at a predetermined distance from the viewer. This distance may be substantially equal to the eye's natural focusing distance to minimize eyestrain. The eyepiece means produces large D shaped exit pupils having an interpupillary diameter substantially equal to the average viewer's natural interpupillary distance. A common objective assembly reduces magnification differences between the left and right eye. The system has high resolution over a wide field of view with a long object to lens working distance and enhanced depth perception.

11 Claims, 1 Drawing Sheet

STEREOMICROSCOPIC INSPECTION SYSTEM WITH LOW EYESTRAIN FEATURES

BACKGROUND OF THE INVENTION

1. Field of the Invention

The present invention relates to an optical inspection system and more particularly to a stereomicroscope with low eyestrain features and low operator interface requirements.

2. Description of the Related Art

Visual inspection tools are used in several industrial fields to inspect components and connections for defects which cannot be seen with the naked eye. Many industries have stringent magnification specifications which must be met in order for the inspected components and connections to meet desired specifications. In the soldering industry, especially the aerospace circuit board industry, solder connections must be inspected to meet desired specifications. Visual aids, such as stereomicroscopes, are used to increase the apparent size of the viewed solder connections. This increase in size enables an operator to better view and determine whether or not the solder connections meet desired specifications. Other applications will become apparent which utilize stereomicroscopes for inspection where viewing with the naked eye is inadequate.

The viewing of components through a visual inspection aid is enhanced by two-eye viewing. Two-eye viewing if correctly implemented enables the operator to reduce eyestrain; however prior stereomicroscopes have had very small, less than 0.1 inch diameter, exit pupils which require the operator to sit very still and carefully adjust the eyepiece separation in order to match his eye pupil separation (interpupillary distance) with that of the stereo-microscope. Such adjustments require expensive prism trains and mechanical fixturings to enable viewing of an object through the stereomicroscope. Small exit pupils also require the operator to remain nearly motionless while viewing through the stereomicroscope, which produces fatigue and eyestrain.

Although some stereomicroscopes have enlarged exit pupils, they do not allow freedom of motion of the operator's head and are susceptible to other operational problems. The MAC 2 stereomicroscope, manufactured by Projectina and imported from Switzerland by Soldering Technology International, Inc. of San Dimas, Calif., is an example of an existing stereomicroscope with relatively large exit pupils. Disadvantages of microscopes of this type include a small field of view; chromatic pupil aberrations; a large magnification difference between left and right eyepieces, which prohibits image fusion; interpupillary distance adjustments are required, and a head support is needed to keep the head from moving with respect to the pupils.

Known stereomicroscopes, in addition to not providing the operator with freedom of head motion, require the operator to view or "crane" the head and neck at awkward angles. In addition such microscopes fail to take advantage of natural eye tendencies such as known average interpupillary distances, the known average eye focusing distance, the known average eye toe-in, and the need for the eye to have a frame of reference. Thus, there is a need in the art for a stereomicroscope which overcomes the disadvantages of the above art stereoscopic inspection systems.

SUMMARY OF THE INVENTION

Accordingly, it is an object of the present invention to overcome the disadvantages of the above art. The new and improved stereomicroscopic inspection system of the present invention comprises a common objective lens assembly which forms an image of an object being viewed and which is positioned a long predetermined working distance adjacent to the object; a prism mechanism, positioned adjacent to the objective assembly which reorients or uprights the image produced by the objective assembly; a telephoto objective assembly, positioned adjacent to the prism mechanism, which focuses the image onto a reticle positioned adjacent to the telephoto assembly; and a heads-up eyepiece assembly, positioned adjacent to the reticle for providing heads-up viewing of the object by the viewer, whereby the system focuses the image a predetermined distance in front of the viewer. This predetermined distance may be substantially equal to the natural focusing distance of the eye. The system further focuses the image at a predetermined toe-in from the two optical axes, said toe-in being substantially equal to the average natural eye toe-in. The system reduces chromatic aberration and magnification differences between the left and right eye of the viewer while still providing a wide field of view and a high resolution image. The telephoto assembly compresses the overall size of the system whereby the viewer's head and eyes are at a comfortable working distance.

The eyepiece means includes clipped, "D" shaped exit pupils having a diameter greater than 0.7 inches, and the which eliminate the need to adjust eyepiece separation, provide the operator with a long eye relief and head motion freedom, thereby further reducing eye-strain and fatigue. The large exit pupils also provide enhanced depth perception. The eyepiece means may further include an instrument myopia corrector wedge which deflects the light rays a predetermined angle to assist both eyes to converge to the natural focusing distance of the eye.

From the subsequent description and claims taken in conjunction with the accompanying drawings, other objects and advantages of the present invention will become apparent to one skilled in the art.

DESCRIPTION OF THE PREFERRED EMBODIMENTS

Figure 1:
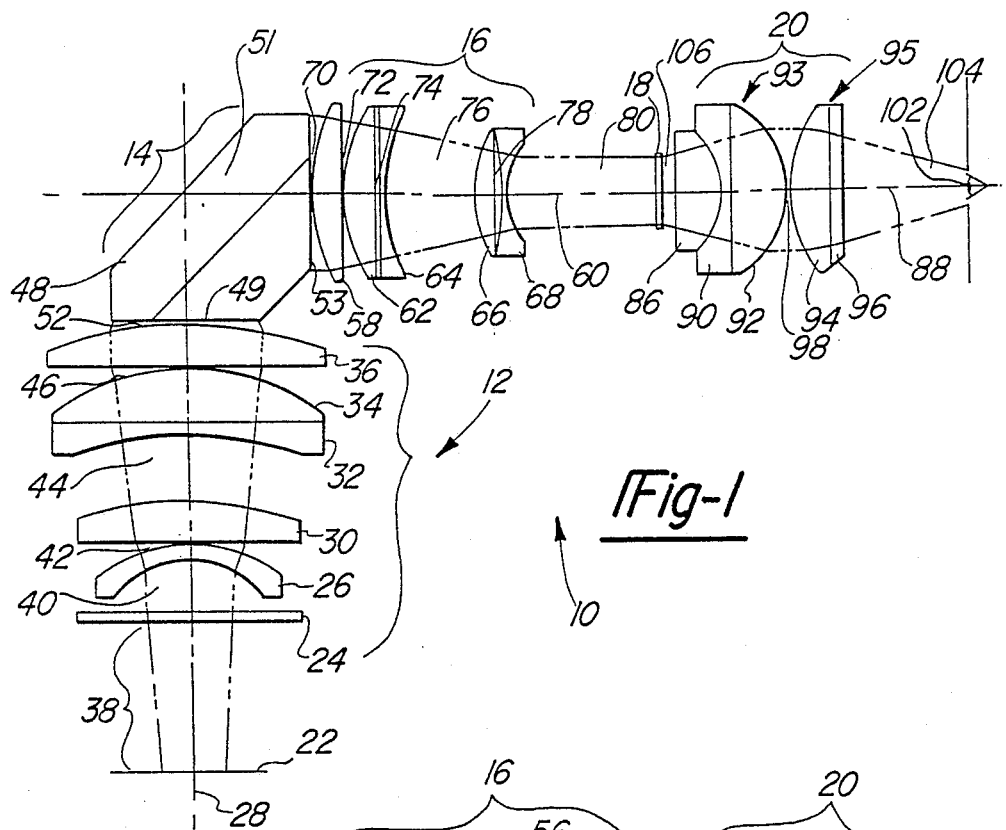
FIG. 1 is a side elevational schematic view of an optical system in accordance with the present invention.
Figure 2:
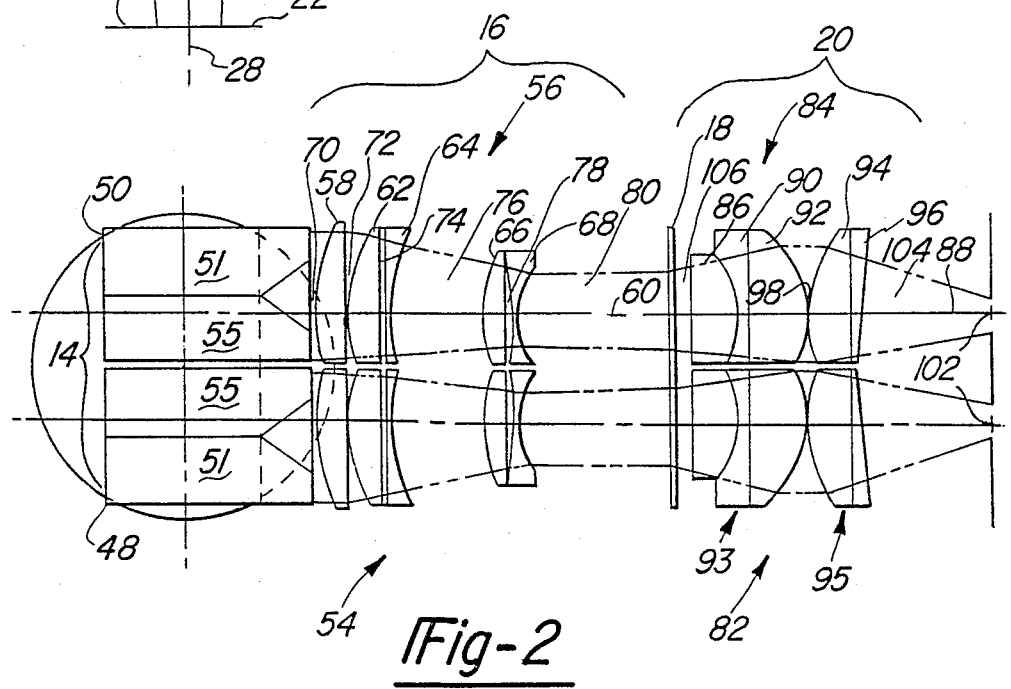
FIG. 2 is a top plan schematic view of the optical system in FIG. 1.

Turning to FIGS. 1 and 2, the stereomicroscopic inspection system is illustrated and designated with reference numeral (10). The system (10) generally includes an objective lens assembly (12) having a prism mechanism (14) positioned adjacent to the objective lens assembly (12). A telephoto objective assembly (16) is positioned adjacent to the prism mechanism (14). A reticle (18) is positioned adjacent to the telephoto objective assembly (16) such that the telephoto objective assembly (16) focuses an image viewed through the objective assembly (12) and prism mechanism (14) onto the reticle (18). An eyepiece assembly (20) is positioned adjacent to the reticle (18).

An object (22) is viewed through the system (10) such that the objective lens assembly (12) forms an image which is projected through the prism mechanism (14). The prism reorientates the image into a proper orientation and passes the image through the telephoto objective assembly (16) which focuses the image upon the reticle (18), where the eyepiece assembly (20) enables a viewer to view the image through the optical system (10).

The objective lens assembly (12) is positioned a desired predetermined working distance (38) above the object (22) being viewed. This working distance is long relative to other stereomicroscopic working distances, being, for example, 3.6 inches in the embodiment of Table I. A glare-reducing member (24) may be positioned between the object (22) and the objective lens assembly (12). The glare-reducing member (24), positioned adjacent to the objective lens assembly (12), generally includes a polarizing element and may have an optional fiber optic illuminating ring (not shown) for reducing glare off of objects having shiny surfaces.

The objective lens assembly (12) generally includes five lens elements. A primary lens (26) defines an optical axis (28) which runs through the vertex of the primary lens (26). Generally, the primary lens is a negative concave-convex lens formed from a low dispersion glass material. The primary lens (26) has a predetermined radius of curvature on the concave or front surface of the lens and a predetermined radius of curvature on the convex or back surface of the lens. Also, the primary lens (26) has a predetermined thickness at the vertex of the lens and predetermined aperture sizes on the concave front surface and the convex back surface.

The secondary lens (30) is centered with respect to the optical axis (28) which runs through the vertex of the secondary lens (30). Generally, the secondary lens (30) is a positive planar-aspheric convex lens formed from a high dispersion glass material. The aspheric shape enhances control of phoreas, spherical aberration of the pupil, astigmatism, and distortion. The secondary lens (30) has a radius of curvature on the planar or front surface of infinity and a predetermined radius of curvature and aspheric constants on the aspheric convex back surface of the lens. Also, the secondary lens (30) has a predetermined thickness at the vertex of the lens and predetermined aperture sizes on the planar front and the aspheric convex back surfaces.

The tertiary lens (32) is centered with respect to the optical axis (28) such that the optical axis (28) runs through the vertex of the tertiary lens (32). Generally, the tertiary lens (32) is a negative concave-planar lens formed from a high dispersion glass material. The tertiary lens (32) has a predetermined radius of curvature on the concave front surface of the lens and a radius of curvature on the planar or back surface of infinity. Also, the tertiary lens (32) has a predetermined thickness at the vertex of the lens and predetermined aperture sizes on the concave front and the planar back surfaces.

The quaternary lens (34) is centered with respect to the optical axis (28) such that the optical axis (28) runs through the vertex of the quaternary lens (34). Generally, the quaternary lens (34) is a positive planar-convex lens formed from a low dispersion glass material. The quaternary lens (34) has a radius of curvature of infinity on the planar or front surface of the lens and a predetermined radius of curvature on the convex or back surface of the lens. Also, the quaternary lens (34) has a predetermined thickness at the vertex of the lens and predetermined aperture sizes on the planar front and the convex back surfaces. Generally, the tertiary and quaternary lenses (32) and (34) are coupled together by conventional means, forming a doublet.

The quinary lens (36) is centered with respect to the optical axis (28) such that the optical axis (28) runs through the vertex of the quinary lens (36). Generally, the quinary lens (36) is a positive planar-aspheric convex lens formed from a low dispersion glass material. The aspheric shape enhances control of phoreas, spherical aberration of the pupil, astigmatism, and distortion. The quinary lens (36) has a radius of curvature of infinity on the planar or front surface of the lens and a predetermined radius of curvature and aspheric constants on the aspheric convex or back surface of the lens. Also, the quinary lens (36) has a predetermined thickness at the vertex of the lens and predetermined aperture sizes on the planar front and the aspheric-convex back surfaces.

A working space (38), having a predetermined distance, is formed between the object (22) and the glare-reducing member (24). A space (40) is formed between the glare-reducing member (24) and the primary lens (26). The space (40) has a predetermined distance from the vertex of the primary lens (26) to the vertex of the glare-reducing member (24). A second space (42) is formed between the primary lens (26) and the secondary lens (30). The space (42) has a predetermined distance from the vertex of the primary lens (26) to the vertex of the secondary lens (30). A space (44) is formed between the secondary lens (30) and tertiary lens (32). The space (44) has a predetermined distance from the vertex of the secondary lens (30) to the vertex of the tertiary lens (32). A space (46) is formed between the quaternary lens (34) and quinary lens (36). The space (46) has a predetermined distance from the vertex of the quaternary lens (34) to the vertex of the quinary lens (36). The spaces (40), (42), (44) and (46), and the lenses (26), (30), (32), (34) and (36) enable the objective lens assembly (12) to transmit an image of the object through the objective lens assembly (12).

The use of a common objective assembly helps to minimize chromatic aberrations and magnification differences across the field of view that would be observed if a dual objective assembly had been used.

The prism mechanism (14) includes a pair of substantially identical roof prisms (48) and (50) which reorientate the image viewed through the objective lens assembly (12) and pass the image to the telephoto objective assembly (16). The prisms (48) and (50) flip the image from right to left and top to bottom so that the image viewed through the eyepiece (20) of the object (22) is in proper orientation. The prisms (48) and (50) are generally right angle roof prisms. The prisms generally have a predetermined thickness through the vertex from the side major surfaces (49) and (53) to the back major surface (51) and (55), and predetermined aperture sizes on the major surfaces (49), (51), (53), and (55) of the prisms (48) and (50).

The prism mechanism (14) is positioned adjacent to the objective lens assembly (12) such that a space (52), having a predetermined distance, is formed between the quinary lens (36) and the side major surface (49) of the prisms (48) and (50). The optical axis (28) runs through the center of the prisms and reorients from vertical to horizontal (i.e., 90°) in passing through the prisms, becoming optical axis (60).

The telephoto objective assembly (16) includes a pair of telephoto optical systems (54) and (56). The telephoto optical system (54) and (56) are generally five element lens systems that are clipped on one side to allow large exit pupils with nominal interpupillary distances and are oriented at 90° from the objective assembly. The systems (54) and (56) are substantially identical and the following description pertains to both optical systems (54) and (56).

A primary lens (58) further defines optical axis (60), which runs through the vertex of the primary lens (58). Generally, the primary lens (58) is a positive convex-planar lens formed from a low dispersion glass material. The primary lens (58) has a predetermined radius of curvature on the convex or front surface of the lens and a radius of curvature of infinity on the planar or back surface of the lens. Also, the primary lens (58) has a predetermined thickness at the vertex of the lens and predetermined aperture sizes on the convex front and the planar back surfaces.

The secondary lens (62) is centered with respect to the optical axis (60) such that the optical axis (60) runs through the vertex of the secondary lens (62). Generally, the secondary lens (62) is a positive convex-planar lens formed from a low dispersion glass material. The secondary lens (62) has a predetermined radius of curvature on the convex or front surface of the lens and a radius of curvature of infinity on the planar or back surface of the lens. Also, the secondary lens (62) has a predetermined thickness at the vertex of the lens and predetermined aperture sizes on the convex surface and the planar back surfaces.

The tertiary lens (64) is centered with respect to the optical axis (60) such that the optical axis (60) runs through the vertex of the tertiary lens (64). Generally, the tertiary lens (64) is a negative biconcave lens formed from a high dispersion glass material. The tertiary lens (64) has a predetermined radius of curvature on the concave or front surface of the lens and a predetermined radius of curvature on the concave or back surface of the lens. Also, the tertiary lens (64) has a predetermined thickness at the vertex of the lens and predetermined aperture sizes on the concave front and the concave back surfaces.

The quaternary lens (66) is centered with respect to the optical axis (60) such that the optical axis (60) runs through the vertex of the quaternary lens (66). Generally, the quaternary lens (66) is a positive convex-planar lens formed from a high dispersion glass material. The quaternary lens (66) has a predetermined radius of curvature on the convex or front surface of the lens and a radius of curvature of infinity on the planar or back surface of the lens. Also,the quaternary lens (66) has a predetermined thickness at the vertex of the lens and predetermined aperture sizes on the convex front and the planar back surfaces.

The quinary lens (68) is centered with respect to the optical axis (60) such that the optical axis (60) runs through the vertex of the quinary lens (68). Generally, the quinary lens (68) is a negative biconcave lens formed from a low dispersion glass material. The quinary lens (68) has a predetermined radius of curvature on the concave or front surface of the lens and a predetermined radius of curvature on the concave or back surface of the lens. Also, the quinary lens (68) has a predetermined thickness at the vertex of the lens and predetermined aperture sizes on the concave and the concave back surfaces.

The telephoto optical systems (54) and (56) are positioned such that a space (70), having a predetermined distance, is formed between the prisms (48) and (50) and the primary lens (58). A space (72) is formed between the primary (58) and secondary (62) lenses. The space (72) has a predetermined distance length from the vertex of the primary lens (58) to the vertex of the secondary lens (62). A space (74) is formed between the secondary and tertiary lenses (62) and (64). The space (74) has a predetermined distance length from the vertex of the secondary lens (62) to the vertex of the tertiary lens (64). A space (76) is formed between the tertiary and quaternary lenses (64) and (66). The space (76) has a predetermined distance length from the vertex of the tertiary lens (64) to the vertex of the quaternary lens (66). A space (78) is formed between the quaternary and quinary lenses (66) and (68). The space (78) has a predetermined distance length from the vertex of the quaternary lens (66) to the vertex of the quinary lens (68). The spaces (74) and (78) help to minimize spherical aberration.

The reticle (18) is positioned a predetermined desired distance from the quinary lens (68) forming a space (80), having a predetermined distance. The reticle (18) is positioned such that the telephoto optical systems (54) and (56) focus an image upon the reticle (18). The reticle (18) is a target reticle and can be computer positioned or may have a fixed position. The reticle (18) may provide the operator with visual cues so that the operator may direct his attention to a precise area to be inspected and is provided a frame of reference for objects being viewed. Generally, the reticle is planar and has a predetermined thickness and size.

The eyepiece assembly (20) includes a pair of eyepiece optical systems (82) and (84) each clipped on one side to allow large exit pupils with nominal interpupillary distances. The eyepiece optical systems (82) and (84) are substantially identical, and the following description pertains to both optical systems (82) and (84).

The primary lens (86) defines an optical axis (88), coincident with optical axis 60, which runs through the vertex of the primary lens (86). Generally, the primary lens (86) is a positive biconvex lens formed from a low dispersion glass material. The primary lens (86) has a predetermined radius of curvature on the convex or front surface of the lens and a predetermined radius of curvature on the convex or back surface of the lens. Also, the primary lens (86) has a predetermined thickness at the vertex of the lens and predetermined aperture sizes on the convex front and the convex back surfaces.

The secondary lens (90) is centered with respect to the optical axis (88) such that the optical axis (88) runs through the vertex of the secondary lens (90). Generally, the secondary lens (90) is a negative convex-planar lens formed from a high dispersion glass material. The secondary lens (90) has a predetermined radius of curvature on the concave or front surface of the lens and a radius of curvature of infinity on the planar or back surface of the lens. Also, the secondary lens (90) has a predetermined thickness at the vertex of the lens and predetermined aperture sizes on the concave front and the planar back surfaces.

The tertiary lens (92) is centered with respect to the optical axis (88) such that the optical axis (88) runs through the vertex of the tertiary lens (92). Generally, the tertiary lens (92) is a positive planar-convex lens formed from a low dispersion glass material. The tertiary lens (92) has a radius of curvature of infinity on the front or planar surface and a predetermined radius of curvature on the convex or back surface of the lens. Also, the tertiary lens (92) has a predetermined thickness at the vertex of the lens and predetermined aperture sizes on the planar front and the convex back surfaces.

The primary, secondary, and tertiary lenses (86), (90) and (92) are coupled together, by conventional means, to form a first triplet (93). The triplet (93) is positioned such that a space (106), having a predetermined distance length, is formed between the reticle (18) and primary lens (86).

The quaternary lens (94) is centered with respect to the optical axis (88) such that the optical axis (88) runs through the vertex of the quaternary lens (94). Generally, the quaternary lens (94) is a positive aspheric convex-planar lens formed from a low dispersion glass material. The aspheric shape enhances control of phoreas, spherical aberration of the pupil, astigmatism, and distortion. The quaternary lens (94) has predetermined radius of curvature and aspheric constants on the aspheric convex or front surface of the lens and a radius of curvature equal to infinity on the planar or back surface of the lens. Also, the quaternary lens (94) has a predetermined thickness at the vertex of the lens and predetermined aperture sizes on the aspheric convex front and the planar back surfaces.

The quinary lens (96) is centered with respect to the optical axis (88), such that the optical axis (88) runs through the vertex of the quinary lens (96). Generally, the quinary lens (96) is a planar wedge having a predetermined wedge angle and formed from a very low dispersion glass material. The wedge causes the images transmitted through the eyepiece optical systems (82) and (84) to be fused together at a predetermined distance in front of the operator. The wedge also provides the system with a 4° toe in and a 0.8m focus. The 4° toe-in approximates the natural toe-in of the eye. The quinary lens (96) has a radius of curvature of infinity on the planar front and planar back surfaces of the lens. Also, the quinary lens (96) has a predetermined thickness at the vertex of the lens and predetermined aperture sizes on the planar front and planar back surfaces.

The quaternary and quinary lenses (94) and (96) are coupled together, by conventional means, to form a doublet (95). The doublet (95) is positioned with respect to the triplet (93) such that a space (98), having a predetermined distance length, is formed between the triplet (93) and doublet (95). The quinary lens (96) is positioned a desired distance, forming a space (104), adjacent to the exit pupil (102). At the exit pupil (102) may be an electronic sensor or the like, however, normally the human eye is located at the exit pupil (102), in which case the human eye would be the aperture stop.

The eyepiece optical systems (82) and (84) position the virtual image of the object (22) at a predetermined distance from the viewer; unlike the infinity focusing distance of most stereomicroscopic inspection systems. The predetermined image distance may be chosen to be approximately 31-½ inches in front of the viewer into the system, which is substantially equal to the average natural focusing distance (i.e. 8 meters) for the eye.

The eyepiece optical systems (82) and (84) include two exit pupils (102) having D (clipped) shapes and large diameters. The D shapes permit the exit pupils to be large enough to approximate the natural average interpupillary distance while maintaining a large field of view with large diameter pupils. This shape permits the exit pupils' diameters to exceed 0.75 inch. Such large D shaped exit pupils (102) enable the operator to freely locate his head about the exit pupil (102) with a high degree of tolerance. Also, the large diameter exit pupils (102) enable the elimination of interpupillary adjustments. The eyepieces are also clipped at the bottom to remove glass that might obscure a glancing, unaided view of the object to check movement, placement, etc.

A specific prescription for a 4 magnifying power (4x magnification) stereomicroscope having a wide field of view is given in the following table. The parameters are given for the common objective lens assembly (12) and for a single prism (48) and (50), telephoto (54) and (56), and eyepiece (82) and (84) system. Note that the parameters below apply to the pair of prisms (48) and (50), telephoto (54) and (56), and eyepiece (82) and (84) optical systems.

TABLE I

| | | Optical Prescription | | | | |
|---|---|---|---|---|---|---|
| | Glass | Radius of Curvature | | Thickness | Aperture Diameter | |
| Element Number | Type | Front | Back | at Vertex | Front | Back |
| (38) Working Distance | — | — | — | 3.600 | — | — |
| (24) Glare Reduction Member | BK7 | INF | INF | 0.250 | 5.450 | 5.450 |
| (40) Space | — | — | — | 1.235 | — | — |
| (26) Objective Primary Lens | SK16 | 2.1825 CC | 3.7387 CX | 0.350 | 3.550 | 4.340 |
| (42) Space | — | — | — | 0.040 | — | — |
| (30) Objective Secondary Lens | LAFN2 | INF | Aspheric CX$^1$ | 0.950 | 5.200 | 5.200 |
| (44) Space | — | — | — | 1.559 | — | — |
| (32) Objective Tertiary Lens | SF57 | 8.3382 CC | INF | 0.280 | 5.500 | 6.300 |
| (34) Objective Quaternary Lens | SK16 | INF | 5.5826 CX | 1.300 | 6.300 | 6.300 |
| (46) Space | — | — | — | 0.040 | — | — |
| (36) Objective Quinary | SK16 | INF | Aspheric CX$^2$ | 1.000 | 6.500 | 6.500 |

TABLE I-continued

Optical Prescription

| | Lens | | | | | | |
|---|---|---|---|---|---|---|---|
| (52) | Space | — | — | — | 0.10 | — | — |
| (48) | Prism | BAK1 | INF | INF | 5.9750 | 3 × 3.5 | 3 × 3.5 |
| (70) | Space | — | — | — | 0.100 | — | — |
| (58) | Telephoto Primary Lens | SK16 | 4.6769 CX | INF | 0.700 | 4.00 | 4.00 |
| (72) | Space | — | — | — | 0.04 | — | — |
| (62) | Telephoto Secondary Lens | SK16 | 3.7387 CX | INF | 0.750 | 3.800 | 3.800 |
| (74) | Space | — | — | — | 0.080 | — | — |
| (64) | Telephoto Tertiary Lens | SF57 | 54.956 CC | 4.5455 CC | 0.180 | 3.800 | 3.460 |
| (76) | Space | — | — | — | 2.069 | — | — |
| (66) | Telephoto Quaternary Lens | SF4 | 3.3175 CX | INF | 0.500 | 2.880 | 2.880 |
| (78) | Space | — | — | — | 0.0969 | — | — |
| (68) | Telephoto Quinary Lens | SK16 | 16.253 CC | 1.6487 CC | 0.200 | 2.600 | 2.100 |
| (80) | Space | — | — | — | 3.505 | — | — |
| (18) | Reticle | BK7 | INF | INF | 0.080 | 1.625 × 6.375 (Rectangular Front & Back) | |
| (106) | Space | — | — | — | 0.375 | — | — |
| (86) | Eyepiece Primary Lens | BK7 | 15.590 CX | 1.8438 CC | 1.125 | 2.40 | 2.600 |
| (90) | Eyepiece Secondary Lens | SF57 | 1.8438 CC | INF | 0.200 | 2.600 | 3.700 |
| (92) | Eyepiece Tertiary Lens | LAK21 | INF | 2.3979 CX | 1.350 | 3.700 | 3.700 |
| (98) | Space | — | — | — | 0.040 | — | — |
| (94) | Eyepiece Quaternary Lens | LAK21 | Aspheric CC[3] | INF | 1.00 | 3.700 | 3.700 |
| (96) | Eyepiece Quinary Lens | FK5 | INF | INF | 0.270 | 3.700 | 3.700 |
| (104) | Space | — | — | — | 2.934 | — | — |
| (102) | Exit Pupil | | | | | .875 | |

Image Distance = −31.5
CC—Concave Surface
CX—Convex Surface
INF—Planar Surface
Measurements are in inches.
Positive distances are to the right and negative distances are to the left.
The glass types are standard commercially available glass types, which are well known by the nomenclature used to those skilled in the art.
The following polynomial defines the sag of curvature for the aspheric surfaces.

$$Z = \frac{\frac{Y^2}{R}}{1 + \left(1 - (1+K)\frac{Y^2}{R^2}\right)^{\frac{1}{2}}} + AY^4 + BY^6 + CY^8 + DY^{10}$$

Z = Sag of curvature of the lens
Y = Radial distance from the vertex
R = Base radius
K = Conic constant
A = Aspheric constant
B = Aspheric constant
C = Aspheric constant
D = Aspheric constant
The values for the aspheric surfaces are as follows:

(1) R = 8.6459 CX
K = +3.1089
A = +3.213 × $10^{-4}$
B = −1.035 × $10^{-5}$
C = +1.903 × $10^{-6}$
D = 0

(2) R = 8.966 CX
K = −2.427
A = −3.284 × $10^{-5}$
B = +1.883 × $10^{-6}$
C = +4.338 × $10^{-7}$
D = 0

(3) R = 2.6911 CX
K = −7.044
A = +2.212 × $10^{-2}$
B = −1.649 × $10^{-3}$
C = −3.936 × $10^{-4}$
D = +7.904 × $10^{-5}$

If it is assumed that the eye of an observer is about 2″ from the last surface of the eyepiece, it can be seen that Advantages provided by the system, which is merely an example of the preferred embodiment of the invention, are thus apparent. Among other things, the system provides the viewer high resolution over a wide field of view with freedom of head movement while viewing an object with the head upright and at a comfortable working distance. Interpupillary adjustments are eliminated and the viewer's eyes are more relaxed as they converge and focus at natural distances. These features, singularly and in combination, reduce eyestrain and fatigue. Also, the invention provides enhanced depth perception by virtue of its large exit pupils and large common objective acceptance angles.

Specific utility of the present invention includes all aspects of inspection of solder connection in various industries. Particularly, low power inspection of solder connections on circuit boards and the like is an area of obvious utility as well as other industrial applications where naked eye visualization cannot detect the imperfections in the solder connections.

While it will be apparent that the preferred embodiment is well calculated to fill the above stated objectives, it will also be appreciated that the present invention is susceptible to modification, variation, alteration, and change without varying from the proper scope and fair meaning of the subjoined claims.

What is claimed is:

1. A stereomicroscopic inspection system with low eyestrain features comprising:
   a common objective means for forming an image of an object being inspected by a viewer and positioned a predetermined working distance adjacent to the object;
   first and second optical paths, each said path including:
   prism means positioned immediately adjacent to said common objective means for orienting said image viewed through said objective means along a heads-up axis;
   telephoto objective assembly means positioned adjacent said prism means for focusing of said image transmitted through said prism means;
   reticle means positioned adjacent said telephoto objective means, said telephone objective means focusing said image transmitted through said telephoto objective means onto said reticle means; and
   eyepiece means positioned adjacent said reticle means for providing heads-up viewing of the object by the viewer over a field of view, said eyepiece means including an instrument myopia corrector wedge, said wedge being disposed most proximate the viewer, said system focusing the image at a predetermined distance being substantially equal to the natural focusing distance of the eye.

2. The system according to claim 1 wherein said telephoto means and said eyepiece means are clipped.

3. The system according to claim 1 wherein said eyepiece means includes a pair of D shaped exit pupils having an interpupillary distance substantially equal to the average human interpupillary distance.

4. The system according to claim 3, whereby said exit pupils and the common acceptance angles thereof provide enhanced depth perception to the viewer.

5. The system according to claim 1, wherein the straight line distance from the viewer's eyes to the object is at least 75% of the predetermined distance, whereby eyestrain is reduced in alternating between unaided viewing and viewing through the system.

6. The system according to claim 1 wherein said working distance is at least 1.4 times its effective focal length.

7. The system according to claim 1, whereby said system provides the operator a sharp image over substantially the entire field of view.

8. The system according to claim 1, whereby said system provides the operator with freedom of head movement with respect to the field of view.

9. The system according to claim 1, said eyepiece means including a headsup display, whereby said system provides the viewer with ease of viewing and control over the object being viewed with respect to the field of view.

10. The system according to claim 1, said system including clipped telephoto objective assembly means and clipped eyepiece means, said clipped eyepiece means including large exit pupils, whereby the need for interpupillary adjustments is eliminated.

11. The system according to claim 1 wherein said system conforms substantially to the following table in which all elements have the characteristic values shown and, proceeding from the object to the eye of the viewer:

| Element Number | Glass Type | Radius of Curvature | | Thickness at Vertex | Aperture Diameter | |
|---|---|---|---|---|---|---|
| | | Front | Back | | Front | Back |
| (38) Working Distance to object | — | — | — | 3.600 | — | — |
| (24) Glare Reduction Member | BK7 | INF | INF | 0.250 | 5.450 | 5.450 |
| (40) Space | — | — | — | 1.235 | — | — |
| (26) Objective Primary Lens | SK16 | 2.1825 CC | 3.7387 CX | 0.350 | 3.550 | 4.340 |
| (42) Space | — | — | — | 0.040 | — | — |
| (30) Objective Secondary Lens | LAFN2 | INF | Aspheric CX[1] | 0.950 | 5.200 | 5.200 |
| (44) Space | — | — | — | 1.559 | — | — |
| (32) Objective Tertiary Lens | SF57 | 8.3382 CC | INF | 0.280 | 5.500 | 6.300 |
| (34) Objective Quaternary Lens | SK16 | INF | 5.5826 CX | 1.300 | 6.300 | 6.300 |
| (46) Space | — | — | — | 0.040 | — | — |

-continued

| | | | | | | |
|---|---|---|---|---|---|---|
| (36) Objective Quinary Lens | SK16 | INF | Aspheric CX² | 1.000 | 6.500 | 6.500 |
| (52) Space | — | — | — | 0.10 | — | — |
| (48) Prism | BAK1 | INF | INF | 5.9750 | 3 × 3.5 | 3 × 3.5 |
| (70) Space | — | — | — | 0.100 | — | — |
| (58) Telephoto Primary Lens | SK16 | 4.6769 CX | INF | 0.700 | 4.00 | 4.00 |
| (72) Space | — | — | — | 0.04 | — | — |
| (62) Telephoto Secondary Lens | SK16 | 3.7387 CX | INF | 0.750 | 3.800 | 3.800 |
| (74) Space | — | — | — | 0.080 | — | — |
| (64) Telephoto Tertiary Lens | SF57 | 54.956 CC | 4.5455 CC | 0.180 | 3.800 | 3.460 |
| (76) Space | — | — | — | 2.069 | — | — |
| (66) Telephoto Quaternary Lens | SF4 | 3.3175 CX | INF | 0.500 | 2.880 | 2.880 |
| (78) Space | — | — | — | 0.0969 | — | — |
| (68) Telephoto Quinary Lens | SK16 | 16.253 CC | 1.6487 CC | 0.200 | 2.600 | 2.100 |
| (80) Space | — | — | — | 3.505 | — | — |
| (18) Reticle | BK7 | INF | INF | 0.080 | 1.625 × 6.375 (Rectangular Front & Back | |
| (106) Space | — | — | — | 0.375 | — | — |
| (86) Eyepiece Primary Lens | BK7 | 15.590 CX | 1.8438 CC | 1.125 | 2.40 | 2.600 |
| (90) Eyepiece Secondary Lens | SF57 | 1.8438 CC | INF | 0.200 | 2.600 | 3.700 |
| (92) Eyepiece Tertiary Lens | LAK21 | INF | 2.3979 CX | 1.350 | 3.700 | 3.700 |
| (98) Space | — | — | — | 0.040 | — | — |
| (94) Eyepiece Quaternary Lens | LAK21 | Aspheric CC³ | INF | 1.00 | 3.700 | 3.700 |
| (96) Eyepiece Quinary Lens | FK5 | INF | INF | 0.270 | 3.700 | 3.700 |
| (104) Space to viewer | — | — | — | 2.934 | — | — |
| (102) Exit Pupil | | | | | .875 | |

Image Distance = −31.5
CC—Concave Surface
CX—Convex Surface
INF—Planar Surface
Measurements are in inches.
Positive distances are to the right and negative distances are to the left.
The glass types are standard commercially available glass types, which are well known by the nomenclature used to those skilled in the art.
The following polynomial defines the sag of curvature for the aspheric surfaces.

$$Z = \frac{\frac{Y^2}{R}}{1 + \left(1 - (1+K)\frac{Y^2}{R^2}\right)^{\frac{1}{2}}} + AY^4 + BY^6 + CY^8 + DY^{10}$$

Z = Sag of curvature of the lens
Y = Radial distance from the vertex
R = Base radius
K = Conic constant
A = Aspheric constant
B = Aspheric constant
C = Aspheric constant
D = Aspheric constant
The values for the aspheric surfaces are as follows:

(1) R = 8.6459 CX
K = +3.1089
A = +3.213 × 10⁻⁴
B = −1.035 × 10⁻⁵
C = +1.903 × 10⁻⁶

(2) R = 8.966 CX
K = −2.427
A = −3.284 × 10⁻⁵
B = +1.883 × 10⁻⁶
C = +4.338 × 10⁻⁷

(3) R = 2.6911 CX
K = −7.044
A = +2.212 × 10⁻²
B = −1.649 × 10⁻³
C = −3.936 × 10⁻⁴

-continued

| D = 0 | D = 0 | D = +7.904 × 10⁻⁵ |

* * * * *

UNITED STATES PATENT AND TRADEMARK OFFICE
CERTIFICATE OF CORRECTION

PATENT NO. : 4,824,228
DATED : APRIL 25, 1989
INVENTOR(S) : DAVID R. WICKHOLM, DONALD J. STRITTMATTER

It is certified that error appears in the above-identified patent and that said Letters Patent is hereby corrected as shown below:

Column 9, last paragraph, the following portion of the text has been omitted and should be added:

"the total length of the system from the viewer to the object is roughly 33 inches, i.e. 15.1 inches from the object to the prisms, and 18.7 inches from the prism to the viewer. Accordingly, a diagonal glance distance of about 24 inches results, which is comfortably close to the focus distance for the object i.e., 31.9 inches. Therefore, the viewer is provided a comfortable viewing distance when directly viewing the object under inspection."

Signed and Sealed this

Ninth Day of January, 1990

Attest:

JEFFREY M. SAMUELS

Attesting Officer  Acting Commissioner of Patents and Trademarks